Sept. 28, 1965    W. J. D. ESCHER    3,208,132
METHOD OF MAKING A MULTI-WALLED CHAMBER
Filed April 13, 1962    3 Sheets-Sheet 1

INVENTOR
WILLIAM J. D. ESCHER

BY
ATTORNEYS

Sept. 28, 1965          W. J. D. ESCHER            3,208,132
            METHOD OF MAKING A MULTI-WALLED CHAMBER
Filed April 13, 1962                         3 Sheets-Sheet 2

INVENTOR
WILLIAM J. D. ESCHER

BY

ATTORNEYS

Sept. 28, 1965 W. J. D. ESCHER 3,208,132
METHOD OF MAKING A MULTI-WALLED CHAMBER
Filed April 13, 1962 3 Sheets-Sheet 3

INVENTOR
WILLIAM J. D. ESCHER

BY

ATTORNEYS

United States Patent Office 3,208,132
Patented Sept. 28, 1965

3,208,132
METHOD OF MAKING A MULTI-WALLED CHAMBER
William J. D. Escher, 10009 Strong Drive SE., Huntsville, Ala.
Filed Apr. 13, 1962, Ser. No. 187,447
8 Claims. (Cl. 29—157)
(Granted under Title 35, U.S. Code (1952), sec. 266)

The invention described herein may be manufactured and used by or for the Government of the United States of America for governmental purposes without the payment of any royalties thereon or therefor.

The present invention relates to an improved method for manufacturing a chamber including a plurality of tubular sections in the walls thereof and more particularly to an improved method for manufacturing a regeneratively cooled rocket engine thrust chamber.

In the field of rocket engine technology, it is usually required that means be provided to conduct excess heat away from the thrust chamber in order to prevent the intense heat from burning through the wall surface. As used herein, the term thrust chamber is defined as including the thrust chamber, combustion chamber or nozzle assembly. A number of methods of accomplishing such cooling have been utilized heretofore, however, the most usual technique has been regenerative cooling. In the practice of regenerative cooling it is customary to cause the unburned rocket propellant to pass over the exterior surface of the combustion chamber so that a large portion of the heat in the chamber wall is absorbed by the propellant and conducted away.

Regenerative cooling, in addition to preheating the propellant, maintains the chamber at a lower ambient temperature and prevents hot spots from developing which may result in chamber destruction. Thus less critical material may be used for the chamber surface. Customarily the chamber is constructed in a double walled configuration so that a number of passageways exist therein which completely surround the chamber and which permit the propellant to be circulated for coolant purposes.

It is necessary that the surface area of the regeneratively cooled chamber be substantially covered by coolant passageways to prevent local areas from overheating. The principal method of the prior art for constructing such combustion chambers has been to weld or braze a plurality of tubes or cylinders, of tapered or other shape, into the desired configuration. Usually tubes of relatively small diameter are used to construct the chamber. Therefore, a large number are needed to complete the assembly. This requires many near perfect welds at the points where each tube contacts the one next adjacent. A principal source of engine failure has been the occurrence of a burn-through at the point of a faulty or weak weld.

It is highly desirable that an improved method be developed for constructing a multi-walled chamber wherein substantially the entire surface area is in close proximity to a passageway suitable for coolant flow. Particular attention must be directed toward obviating the principal points of failure of the prior art; that is, the weld or braze points where present engines tend to burn-through.

In addition, it is desirable that the method of construction be relatively simple so that regeneratively cooled chambers may be produced without the attendant high cost that normally results from having to individually weld or join together a large number of tubular sections.

The instant invention contemplates a solution to the problem of manufacturing a regeneratively cooled combustion chamber by pre-forming the entire outer surface of such chamber from a single continuous sheet, and then, by a separate step, forming the entire interior surface within, and adjacent to, the pre-formed outer surface. The two surfaces may then be welded or brazed together by relatively simple techniques which are well known. Of course, the method of joining the surfaces is not limited to welding or brazing but comprehends any of the many techniques known to the art. Such a procedure results in the desired tubular construction without the disadvantage of bonding junctions extending through the liner construction where an imperfect joint might leave a "pin hole" opening which could result in engine failure.

As will be pointed out more clearly hereinafter, the described method of construction will utilize an outer die having the desired configuration for the chambers outer surface, and a plurality of mold inserts which are fixedly positioned adjacent to the outer chamber surface after it is formed to permit the desired inner chamber shape to be obtained. It will be further noted that the described method provides an economical waste-free procedure for constructing an intricate, and what has been, an extremely expensive regeneratively cooled thrust chamber.

Although the invention is found to be extremely useful in the construction of rocket engine combustion chambers, and is described in such an environment, it should be realized that the practices and techniques to be explained hereinafter are not limited to that of a single application. It will be immediately obvious to one skilled in the art that the present method is applicable to the construction of any multi-walled configuration where it is desired to have discreet passageways contained therein. It will be found that the more involved and the more complex the passageway configuration desired, the more effective the present invention will be in relation to the prior art. A particularly pronounced value will be discovered when the resultant shape is such that the two wall segments are not readily separable after their formation to permit the removal of the mold material. The detailed particulars of the invention will be more easily appreciated as the description proceeds in development in the remaining portions of this specification.

Accordingly, one object of the present invention is to provide an improved method for the manufacture of a fluid cooled wall surface.

Another object is to provide an improved method of manufacturing a wall surface containing preshaped passageways.

Yet another object is to provide a cheaper and improved method of manufacturing a regeneratively cooled combustion chamber.

A further object is to provide an improved method of manufacturing a rocket engine combustion chamber having increased resistance to high temperature failure.

Yet a further object is to provide a regeneratively cooled rocket engine having increased reliability and resistance to destruction.

Other objects of this invention will become apparent upon a more comprehensive understanding of the invention for which reference is made to the following specification and drawings which describe illustrative embodiments of the invention and wherein.

Figure 1:
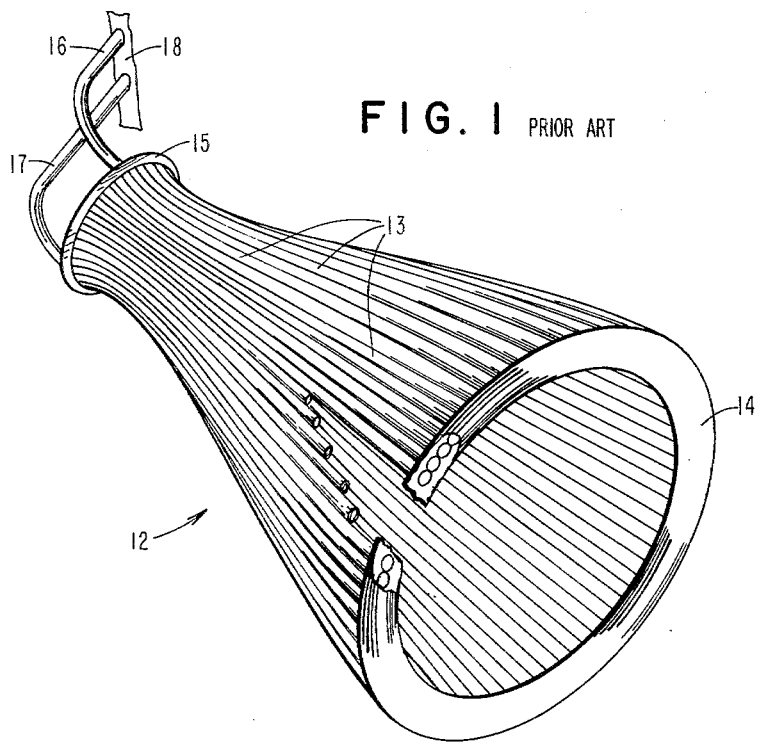
FIG. 1 is a perspective view of a regeneratively cooled rocket engine thrust chamber, comprising a plurality of tubular segments, manufactured according to the teachings of the prior art.

Referring now to FIG. 1 there is illustrated a typical regeneratively cooled rocket engine thrust chamber constructed according to the techniques of the prior art. The chamber, illustrated generally at 12, comprises a plurality of tubular members 13 radially arranged about a central axis. It is usually desirable that each of the several tubular members be constructed in a non-linear manner so that the assembled product is a double bell or hourglass shaped configuration larger at one end than the other. A manifold 14 is provided at the larger end with each of the tubular members 13 connected thereto. The cut-away detail in FIG. 1 illustrates how the tubular members 13 are connected to manifold 14 through its side walls so that each tubular member is connected therethrough to every other such tubular member. At the opposite, and smaller end of the chamber, a second manifold 15 is provided, again connecting the tubular members 13, although in a different manner.

There are a number of techniques for cycling the propellant through the chamber wall to accomplish regenerative cooling. However, for purposes of illustration, one common method will be described. This method calls for fuel to be pumped into the chamber wall at one end, allowed to flow the length thereof, return to the initial end and then be removed from the wall structure. In order to accomplish such a result, one technique is to divide manifold 15 into two parallel sections, extending the length of the manifold, with alternate tubular members 13 connected to alternate sections of manifold 15.

A fuel inlet pipe 16 is connected to one section of manifold 15 while fuel exhaust pipe 17 is connected to the other section thereof. Suitable means, illustrated schematically at 18, are provided to store the unburned fuel or oxidizer and to pump it to and from the thrust chamber cooling tubes.

In operation, the propellant will flow into one section of manifold 15 and then flow through alternate tubular members 13 to manifold 14. The inlet pressure will then cause the propellant to flow back through the remaining alternate tubular members to the section of manifold 15 connected to exhaust pipe 17 and thus return to storage tank 18. Alternately, the exhaust 17 may connect directly to a utilization device such as fuel injectors. In this manner it will be seen that a continuous flow of fluid is maintained through the entire chamber wall section.

The method of constructing tubular walled combustion chambers for use with the regenerative cooling principle, as illustrated in FIG. 1, has generally consisted of welding or brazing together a large number of individual tubular members. Previous experience has demonstrated that such a method of construction is costly, inefficient, time consuming and results in a structure with comparatively unreliable operating characteristics. Due to the relatively large number of delicate quality sensitive welds that must be accomplished, a difficult problem in quality control has arisen. In addition to a very high rejection rate, combustion chambers which appear upon inspection to be satisfactory have in many instances proved defective in operation. One of the most difficult problems encountered has been the tendency for such chambers to "burn through" along the weld lines. The smallest "pin hole" may result in destruction of the chamber during operation.

Figure 2:
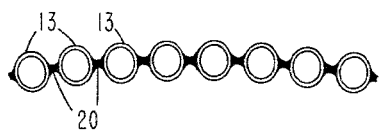
FIG. 2 is a cross section of the tubular construction of FIG. 1 illustrating the method of manufacture utilized by the prior art.

The particular type of construction utilized when the coolant tubes are welded together is illustrated in FIG. 2 where the wall forming tubes 13 are shown in cross section connected by welds 20. Each of these welds represents a difficult and time consuming operation which must be accomplished with a high degree of precision to prevent any imperfections which may result in a breakdown during combustion.

Figure 3:
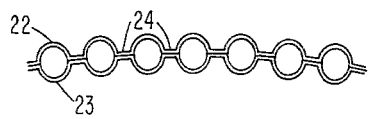
FIG. 3 is a cross section illustrating the continuous wall surface resulting from the practice of the instant invention.

The present invention contemplates the utilization of a method of manufacture resulting in a thrust chamber having a cross sectional configuration of the type illustrated in FIG. 3. It will be noted that the outer surface of the combustion chamber constitutes a single sheet forming a half-section of each of the wall forming tubes. A second sheet is, in like manner, shaped to constitute the inner half of the wall forming tubes. It will be appreciated that when the inner and outer surfaces, 22 and 23, are joined together by means of brazing, welding, or some other joining technique, at points 24, the problem of "pin holes" extending through the wall surface along the weld joints is virtually eliminated.

Figure 4:
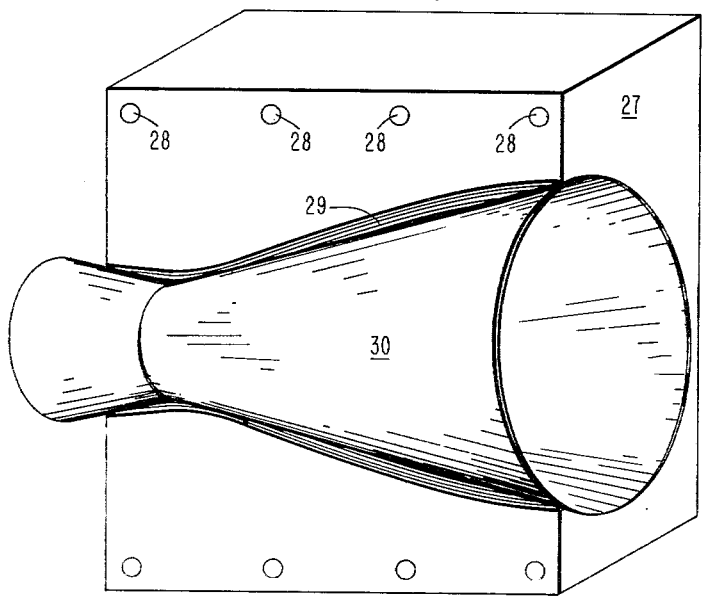
FIG. 4 is an illustration prior to the first forming step in the manufacturing process showing a half die section containing a thrust chamber outer surface blank prior to conforming the blank to the die configuration.

The method of manufacture contemplated by the instant invention requires the use of a female die having the configuration of the outer surface of the desired tubular combustion chamber. A half-section of such a die, 27, is illustrated in FIG. 4. In actual practice it may generally prove desirable to make the die separable into at least quarter sections to facilitate removal of the finished engine combustion chamber therefrom. The die section 27 is provided with keying-holes 28 so that properly positioned stud on the adjacent die surface will insure proper alignment of the assembled die. Interior surface 29 of die section 27 is machined to have the desired configuration of the completed combustion chamber exterior. A preshaped blank 30 of suitable metal sheeting is prepared for insertion in the assembled die. This blank may be of stainless steel or any of the high temperature alloys well known to the art. For ease in forming, the blank should be of such a shape that it approaches the final configuration of the die within permissible clearance limits.

Figure 5:
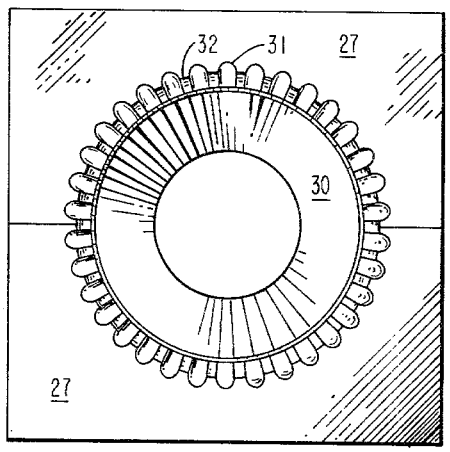
FIG. 5 is an end view of the assembly depicted in FIG. 4 with the entire die illustrated but with the chamber outer surface blank shown slightly reduced in diameter to illustrate the die detail.

Referring to FIG. 5, which is an end view of the assembled die, with the outer chamber blank inserted therein, it will be seen that the die consists of a plurality of axially positioned grooves 31 and ridges 32 corresponding to the desired exterior surface of the combustion chamber. For purposes of clarity in the illustration, so that the detail of grooves 31 and ridges 32 will show, the outer chamber blank 30 is illustrated as having a lesser diameter than that which would normally be desired, and as was shown in FIG. 4.

After the blank 30 is positioned within die 27 any of a number of methods well known to those skilled in the art may be utilized to conform the blank to the configuration of the die. This may consist of hydraulic or explosive forming or in some instances a mechanical fingering technique may be utilized to expand the blank to the desired shape. Although any of these methods may be used to complete the process, a desired procedure is to utilize the technique of explosive forming.

When the exposive forming process is utilized the blank is first positioned within the die, then gaskets or similar seals are positioned around the ends of the blank so that the volume between the blank and the die is surrounded by a liquid seal. After such preparation the entire assembly is immersed in liquid and then an explosive charge, or high energy electric arc, is ignited within the die. The liquid will transmit the expansive force to the blank, immediately conforming it to the configuration of the die. It is of course obvious that the volume between the blank and die must be sealed so that the liquid may not enter and prevent proper forming. The use of the explosive technique is preferred over other methods known to the art due to its economy.

After the outer surface of the combustion chamber has been formed inside the die according to the procedure described above, it is next necessary to form the inner chamber surface. An inspection of the illustrations will make obvious the fact that it is necessary to manufacture a chamber inner surface, having reversed convolutions with respect to the aforesaid outer surface and which can be so positioned that when the two are matched together they will cooperate to form a series of adjacent tubular members.

The instant invention insures perfect registry of the inner and outer surfaces by utilizing the outer surface, while still in the die, to position mold sections about which the inner surface is formed. Therefore, regardless of the irregular shapes that may be desired, there is no problem of forcing two slightly different shapes into registry.

Figure 6:
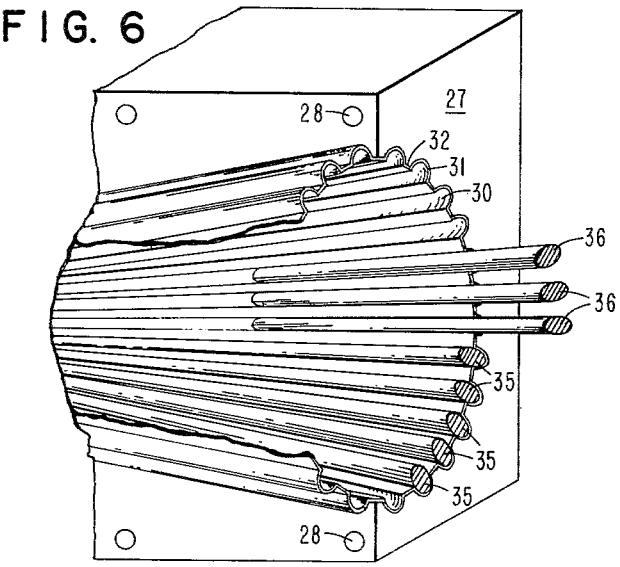
FIG. 6 is an illustration of the assembly of FIG. 4 at a later step in the manufacturing process where the blank shown in FIG. 4 has been conformed to the convolutions of the die and mold inserts are now being placed therein.

Referring now to FIG. 6, there is illustrated a die half-section 27 with an interior surface 29 identical to that shown in FIG. 4. The interior surface 29 consists of a series of grooves 31 and ridges 32 which are machined to the desired outer surface configuration of the combustion chamber. The grooves 31 are used to form the outer half-section of each of the tubular fluid conductors. The ridges 32 correspond to the spaces between each tubular member, or to the weld sections utilized to construct the engine combustion chamber of the prior art.

According to the teaching of the instant invention, the next step in the manufacture of the chamber assembly is to insert a number of precast mold sections into the die, which now contains the outer chamber blank 30 conformed thereto. The mold sections 35 are precast to have the desired shape of the interior of the coolant passages. Of course, the molds are constructed in such a configuration that they will fit into the grooves in the now formed outer chamber blank which is still rigidly held by the die sections. In general practice, the shape of each of these passages is identical to that of every other such passage so that castings of uniform size will suffice to serve as a mold for each passageway, however, this is not required.

For the manufacture of a rocket thrust chamber it is usually preferred that a number of linearly disposed coolant passageways be formed around the chamber exterior. In other applications, variations in the size and shape of the passageways may be desired. In either case, according to the process of this invention, molds are shaped from material that may later be removed from the finished product by dissolving or melting. The molds are inserted into the formed chamber outer surface while it is still in the die. In practice, it will usually prove desirable to fix the molds in position with an adhesive to prevent any slippage.

In order to practice the instant invention in the most efficient manner, the material selected for the individual molds is of considerable importance. It is desirable that this material have certain physical properties which are compatible with the technique used. Considering for a moment that the mold material must be of sufficient strength to withstand the pressure of the forming process and should be capable of easy and rapid removal from the interior of the individual chamber passageways after their formation, it will be seen that severe constraints are placed upon the selection of the mold material.

It has been determined that an appropriate mold material for use in the practice of the present invention may comprise one of the various bismuth alloys. The most common commercially available alloys of this nature are the "cerro" alloys, a trademarked product manufactured by the Cerro de Pasco Corporation, a corporation of Peru. At least four such alloys are sold in this country by the Cerro de Pasco Sales Corporation, 300 Park Avenue, New York 22, New York, under the trade names "Cerrotru," "Cerrosafe," "Cerromatrix," and "Cerrobend." "Cerotru" is a eutectic alloy of bismuth and tin with a melting point of 281° F. and a Brinell hardness number of 22. The second of these alloys, "Cerrosafe," is generally composed of bismuth, lead, tin, and cadmium. It exhibits a Brinell hardness number of 9 and has a melting temperature in the range of 158°–194° F. "Cerromatrix" has a melting temperature in the range of 218°–440° F. and a Brinell hardness number of 19. This latter alloy is especially desirable for the present purpose as the tensile strength is 13,000 lbs. per square inch. The fourth alloy, "Cerrobend," consists of bismuth, lead, tin, and cadmium, has a melting temperature of 158° F., a Brinell hardness number of 9.2, and behaves much in the same manner as "Cerrosafe" except that it is a eutectic alloy.

These or similar alloys may be used as material for the construction of the required coolant passageway molds and are particularly adaptable as such because of their low melting temperature. Although such alloys are relatively malleable, the practice of the instant invention requires only that the molds withstand a one time forming operation, after which they are melted from the finished product and the salvaged material recast.

In some instances where it is desired that a relatively hard mold material be utilized, it may be desirable to cool the molds by immersion in a fluid such as liquid nitrogen. This will reduce the temperature to −320° F. and increase the Brinell hardness number by a factor of about 5. In the case of "Cerrobend" the cooling process will increase the tensile strength from 5990 to approximately 25,000 p.s.i. The cooling process will be particularly appropriate in some instances where it may be desired to form the chamber with the entire assembly cooled by immersion in liquid nitrogen. It has been discovered that such cooling prior to chamber forming will increase the ultimate combustion chamber strength to a considerable degree.

In general, the construction of a rocket engine combustion chamber will require a plurality of identical mold sections which are precast to have the desired coolant passageway configuration. The relatively low melting points of the cerro alloys permit the formation of the desired mold sections by means of a comparatively simple and safe operation.

The precast mold sections are inserted into the die structure after the outer chamber blank 30 has been conformed thereto. As shown in FIG. 6, a number of mold sections 35 have been inserted into the die while three additional sections 36 are illustrated in a semi-inserted position. It will usually prove desirable to attach with an adhesive or otherwise secure the molds to the now formed outer surface so that any slippage with respect thereto is avoided. The configuration of the outer surface is usually such that the mold sections may be inserted therein easily and rapidly with a minimum of skill.

While, for purposes of illustration, the embodiment shown utilizes a plurality of identical mold sections, it should be realized that many instances will arise where it may prove desirable to construct passageways of diverse cross section and configuration within a wall surface. The instant invention contemplates the process of utilizing diverse pre-formed mold sections to construct passageways of any desired configuration. The construction shown, wherein identical symmetrical passageways are manufactured is merely the most obvious utilization of the instant invention and one application wherein great savings in time and money are effectuated.

After the mold sections are inserted into the curved sections formed in the outer surface, which is still positioned within the die, an inner chamber blank is next inserted into the die. This second blank is of slightly less diameter than the previously formed outer chamber blank. Of course, the material used for the inner surface need not be the same as that used for the outer surface. It will be appreciated that the ability to use different material, or materials of different thickness, for the inner and outer surfaces will be highly desirable. For some applications this added flexibility will provide a considerable advantage over the prior art.

A similar explosive or other forming process may be followed to conform this second blank to the configuration presented by the combination of the die, the formed outer chamber blank and the mold sections contained therein. After this second forming process, two chamber wall sections result, each having half circular grooves running throughout their length in opposed relationship, with the adjacent wall sections forming ridges in physical contact with each other. The volume formed by the adjacent half circular grooves is filled by the mold section material.

At this stage the assembly may be removed from the die if desired and the ridge sections of the inner and outer surfaces brazed or welded together at their contact points to form the complete chamber configuration. In some instances these surfaces may be joined while still in the die. It should be understood that the ridge sections may be joined by any of a number of techniques known to the art, such as, silver solder or even an epoxy cement and is not limited to welding or brazing.

The removal of the mold sections may next be accomplished by the application of radiant heat, superheated steam, chemical action or the like, depending on the type alloy utilized to form the molds. The mold sections may be removed either before or after the chamber assembly is removed from the die and before or after the inner and outer walls are joined together as described. The low melting temperature of the cerro alloys makes their removal a relatively low temperature operation and one which will not have an adverse effect on the assembled chamber. After the mold material is removed as described, the resulting inner and outer chamber wall sections are joined together, if this step has not already been accomplished, to form the desired regeneratively cooled thrust chamber.

Figure 7:
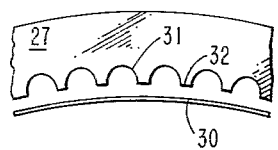
FIG. 7 is a schematic representation prior to the first step in the manufacturing process illustrating the die and an unformed blank which will constitute the thrust chamber outer surface.
Figure 8:
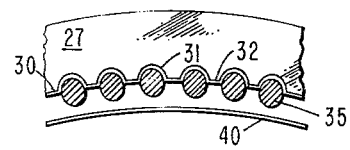
FIG. 8 illustrates the blank of FIG. 7 conformed to the die surface, molds inserted therein and an unformed blank positioned for completion of the chamber inner surface.
Figure 9:
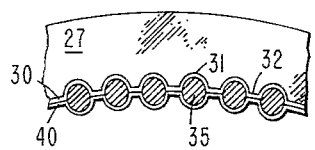
FIG. 9 shows the inner and outer chamber surfaces surrounding the mold inserts after completion of the forming process.
Figure 10:
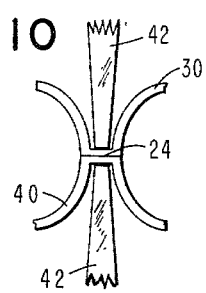
FIG. 10 is an enlarged view of the contact area between the inner and outer chamber surfaces showing how they may be welded or brazed together to provide structural integrity.

Some of the stages in the manufacture of a chamber of the type described are illustrated schematically in FIGS. 7, 8, and 9. In FIG. 7, the die is represented at 27 with grooves 31 and ridges 32 utilized to form the outer surface configuration of a chamber in which it is desired to contruct tubular passageways. The outer chamber surface blank is depicted at 30 prior to the initial forming operation. In FIG. 8, it will be observed that the blank 30 has now been shaped to conform to the die configuration. The mold sections 35 have been shaped to have the desired passageway configuration and to just fit into the grooves of blank 30 formed by conforming the blank 30 to the configuration of the inner die surface 29. After the mold sections 35 are inserted into the respective grooves, an inner blank 40 is positioned adjacent to the die 27, the formed outer blank 30 and mold sections 35. In FIG. 9, the inner blank may be observed in its final configuration such that the inner and outer blanks cooperate to form tubular passageways in the chamber surface. This entire assembly may now be removed if desired from the die 27 so that adjacent flat areas of the inner and outer surfaces may be welded or brazed together as illustrated in FIG. 10 wherein welding electrodes 42 are illustrated in position to join the two blanks at 24.

Figure 11:
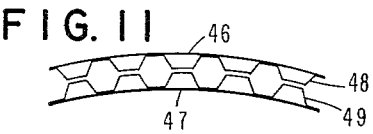
FIG. 11 is a cross section view of a second embodiment of a multi-walled chamber manufactured according to the teaching of the instant invention.

For some purposes, especially where the resulting temperatures are very high, it may be desirable to form additional layers as shown in FIG. 11 which illustrates a honeycomb configuration. It will be noted that the outer surface 46 and the inner surface 47 of the chamber wall are separated by two additional formed wall sections 48 and 49, which in actual practice would be joined at the interface, providing a greater number of coolant passages. Thus, even the area at the bonds is cooled by fluid in one or another of the passages.

A consideration of the resulting structure of the configuration illustrated in FIGS. 3, 9, and 11 will show that there is no tendency for the tubular coolant passageways to pull apart at the welds due to the combustion pressures within the chamber inasmuch as a continuous strip of metal surrounds the entire chamber diameter. This is in contradistinction to the product of the prior art shown in FIG. 2 where individual tubes are welded together and the weld material is the only means of joining adjacent tubular sections. In addition to the advantage of added strength it will be realized that an incomplete weld at any particular spot will not leave a pin hole opening which can result in a "burn-through" during combustion. This makes the entire operation much cheaper and quicker inasmuch as the same quality control limitations are not required as in the case of the prior art.

Although only a single embodiment of the instant invention has been described in detail, it should be understood that various changes in the methods, details, materials, steps, and arrangements of the parts which have been herein described and illustrated in order to explain the nature of the invention may be made by those skilled in the art within the principle and scope of the invention as expressed in the appended claims.

I claim:

1. The method of manufacturing a multi-walled, passageway containing chamber comprising the steps of: forming a first blank; positioning at least one preformed mold adjacent said first blank; forming a second blank by expanding said second blank within the combination of said first blank and said positioned mold; joining said first blank and said second blank; and removing said mold to form a passageway between said blanks.

2. The method of manufacturing a multi-walled, passageway containing chamber comprising the steps of: forming a first blank; positioning at least one preformed bismuth alloy mold adjacent said first blank; forming a second blank by expanding said second blank within the combination of said first blank and said positioned bismuth alloy mold; joining said first blank and said second blank; and removing said bismuth alloy mold by heating to at least the melting temperature of said bismuth alloy.

3. The method of manufacturing a multi-walled, passageway containing chamber comprising the steps of: forming a first wall by expanding a first blank to conform to a die surface; positioning at least one preformed mold adjacent said formed first wall; forming a second wall by expanding a second blank to conform to the combination formed by said die surface, said first wall, and said positioned mold; forming additional walls by sequentially positioning preformed molds adjacent the last formed wall and expanding additional blanks to conform to the combination formed by said die surface, said formed walls and said positioned molds; joining each of said walls to the next adjacent one of said walls; and removing said molds to form passageways between said formed walls.

4. The method of manufacturing a double-walled chamber including at least one passageway between said walls comprising the steps of: forming a first wall by expanding a first blank to conform to a die surface; positioning at least one preformed mold adjacent to said formed first wall; forming a second wall by expanding a second blank to conform to the combination formed by said die surface, said first wall, and said positioned mold; joining said first wall to said second wall; and removing said mold to form a passageway between said first wall and said second wall.

5. The method of manufacturing a double-walled chamber including at least one passageway between said walls comprising the steps of: forming a first wall by expanding a first blank to conform to a die surface; positioning at least one preformed mold comprising an alloy including bismuth adjacent said formed first wall; forming a second wall by expanding a second blank to conform to the combination formed by said die surface, said first wall, and said positioned bismuth mold; joining said first wall and said second wall; and removing said mold by melting said mold to form a passageway between said first wall and said second wall.

6. The method of manufacturing a double-walled combustion chamber including plural passageways between said walls comprising the steps of: forming a first chamber wall by explosively expanding a first blank to conform to a preshaped die surface, said die surface being shaped to conform to the desired outer configuration of said combustion chamber; positioning preformed bismuth alloy molds adjacent said formed first chamber wall to correspond to the desired positions of said passageways; forming a second chamber wall by explosively expanding a second blank to conform to the combination formed by said die surface, said formed first wall and said positioned mold so that portions of said first chamber wall and said second chamber wall are in mutual contact; joining said first wall section to said second wall section along their points of mutual contact; and removing said molds to form passageways between said first and said second walls.

7. The method of manufacturing a double-walled combustion chamber substantially entirely formed of plural passageways between said walls, comprising the steps of: forming a first chamber wall by expanding a first blank to conform to a concave convoluted die surface, said die surface being shaped to conform to the desired outer configuration of said combustion chamber with said surface substantially entirely consisting of convoluted surface area; positioning bismuth alloy molds adjacent said formed first chamber wall in the convolutions formed therein, said molds being preshaped to conform to the convolutions formed in said first chamber wall; forming a second chamber wall by expanding a second blank to conform to the combination formed by said die surface, said formed first wall and said positioned mold so that said first chamber wall and said second chamber wall are in mutual contact between said bismuth alloy molds; joining said first wall section to said second wall section along their points of mutual contact; and removing said mold to form passageways between said first and said second wall.

8. The method of manufacturing a multi-walled, passageway containing chamber comprising the steps of: positioning a first blank within a die assembly, said die having the desired outer configuration of said chamber; forming said first blank to conform to the configuration of said die; inserting and positioning bismuth alloy molds within said formed first blank; adhering said molds to said formed first blank; positioning a second blank within said first blank and said molds; forming said second blank to conform to the configuration presented by said formed first blank and said positioned molds; joining said first and said second blank; removing said bismuth alloy molds by heating to at least the melting point of said bismuth alloy; and removing the resulting chamber from said die assembly.

References Cited by the Examiner

UNITED STATES PATENTS

| | | | |
|---|---|---|---|
| 2,892,253 | 6/59 | Hutchins et al. | 29—421 |
| 2,958,183 | 11/60 | Singelmann | 60—35.6 |
| 2,968,918 | 1/61 | Denison | 60—35.6 |
| 2,976,907 | 3/61 | Harvey et al. | 29—421 |
| 2,995,807 | 8/61 | Gibbs | 29—157.3 |
| 2,999,305 | 9/61 | Reynolds | 29—157.3 |

FOREIGN PATENTS 937,695    9/63    Great Britain.

WHITMORE A. WILTZ, *Primary Examiner.*

JULIUS E. WEST, *Examiner.*